United States Patent
Liska et al.

(10) Patent No.: US 10,738,146 B2
(45) Date of Patent: Aug. 11, 2020

(54) PROCESS FOR FRONTAL POLYMERIZATION OF CATIONICALLY POLYMERIZABLE MONOMERS

(71) Applicant: Technische Universitaet Wien, Vienna (AT)

(72) Inventors: Robert Liska, Schleinbach (AT); Daniel Bomze, Vienna (AT); Wolfgang Kern, Leoben (AT); Patrick Knaack, Vienna (AT)

(73) Assignee: Technische Universitaet Wien, Vienna (AT)

( * ) Notice: Subject to any disclaimer, the term of this patent is extended or adjusted under 35 U.S.C. 154(b) by 83 days.

(21) Appl. No.: 15/757,037

(22) PCT Filed: Sep. 2, 2016

(86) PCT No.: PCT/AT2016/060047
§ 371 (c)(1),
(2) Date: Mar. 2, 2018

(87) PCT Pub. No.: WO2017/035551
PCT Pub. Date: Mar. 9, 2017

(65) Prior Publication Data
US 2019/0309123 A1    Oct. 10, 2019

(30) Foreign Application Priority Data

Sep. 2, 2015 (AT) ..................... 576/2015

(51) Int. Cl.
| C08F 2/46 | (2006.01) |
| C08F 2/50 | (2006.01) |
| C08G 61/04 | (2006.01) |
| C08G 59/40 | (2006.01) |
| C08G 59/24 | (2006.01) |
| C08G 59/68 | (2006.01) |
| C08G 65/10 | (2006.01) |

(52) U.S. Cl.
CPC ....... *C08G 59/4085* (2013.01); *C08G 59/245* (2013.01); *C08G 59/68* (2013.01); *C08G 65/105* (2013.01)

(58) Field of Classification Search
CPC ... C08G 59/4085; C08G 59/245; C08G 59/68
USPC ............ 522/25, 7, 6, 71, 1, 189, 184; 520/1
See application file for complete search history.

(56) References Cited

U.S. PATENT DOCUMENTS

2008/0058443 A1*    3/2008    Moszner ................ A61K 6/083
                                                            523/116

FOREIGN PATENT DOCUMENTS

| DE | 3230960 A1 | 7/1983 |
| EP | 0066543 A2 | 12/1982 |
| GB | 2108509 A | 5/1983 |
| WO | 2007005280 A2 | 1/2007 |
| WO | WO-2017035552 A1 * | 3/2017 ................ C01F 7/50 |

OTHER PUBLICATIONS

Bomze et al, Successful radical induced cationic frontal polymerization of epoxy-based monomers by C-C labile compounds, 2015, Polym. Chem., 6, 8161 (Year: 2015).*
Liska et al, WO 2017035552 Machine Translation, Mar. 9, 2017 (Year: 2017).*
Bomze et al., "Successful radical induced cationic frontal polymerization of epoxy-based monomers by C-C labile compounds," Polymer Chemistry, vol. 6, pp. 8161-8167 (2015).
English Translation of Written Opinion dated Jan. 16, 2017 in Int'l Application No. PCT/AT2016/060047.
Mariani et al., "UV-Ignited Frontal Polymerization of an Epoxy Resin," Journal of Polymer Science Part A: Polymer Chemistry, vol. 42, No. 9, pp. 2066-2072 (Mar. 26, 2004).
Office Action dated Aug. 12, 2016 in AT Application No. 576/2015.

* cited by examiner

*Primary Examiner* — Jessica Whiteley
(74) *Attorney, Agent, or Firm* — Panitch Schwarze Belisario & Nadel LLP

(57) ABSTRACT

The invention relates to a process for free radical-induced cationic frontal polymerization of cationically polymerizable monomers using a combination of at least one cationic polymerization initiator and at least one activator for said at least one initiator, characterized in that benzopinacol is used as said activator.

12 Claims, 1 Drawing Sheet

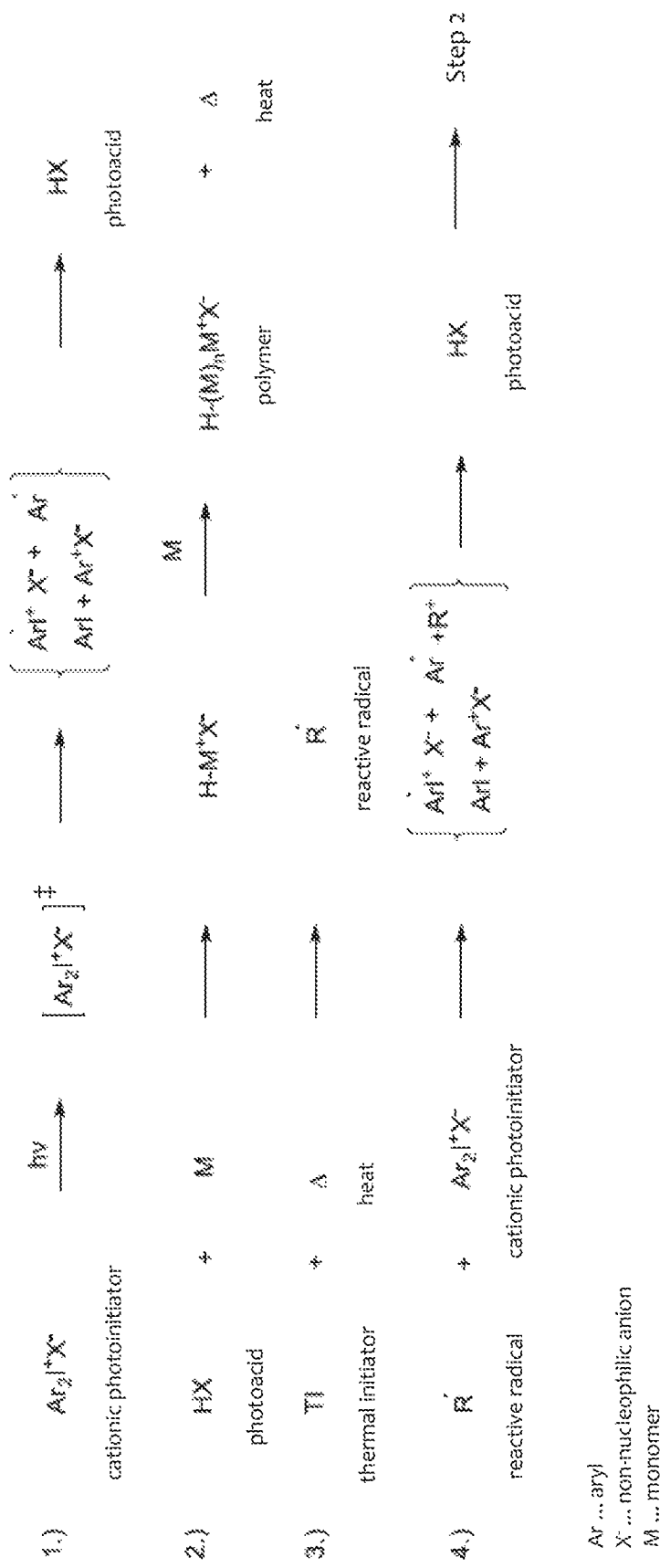

PROCESS FOR FRONTAL POLYMERIZATION OF CATIONICALLY POLYMERIZABLE MONOMERS

CROSS REFERENCE TO RELATED APPLICATION

This application is a Section 371 of International Application No. PCT/AT2016/060047, filed Sep. 2, 2016, which was published in the German language on Mar. 9, 2017 under International Publication No. WO 2017/035551 A1, which claims priority under 35 U.S.C. § 119(b) to Austrian Application No. A 576/2015, filed Sep. 2, 2015, the disclosures of which are incorporated herein by reference in their entirety.

The present invention relates to a new process for frontal polymerization of cationically polymerizable monomers.

STATE OF THE ART

Frontal polymerization is a variation of polymerization reactions in which the reaction zone propagates through the polymerizable material. Like traditional polymerization reactions, frontal polymerization reactions are classified into thermal frontal polymerization (TFP) and photofrontal polymerization (PFP), depending on how they are initiated. TFP theoretically involves a reaction of indefinite duration as long as there is unconsumed reactive monomer material. In PFP reactions, the initiator is bleached in the course of the initiation, resulting in a continuous increase of the light's penetration depth, thus practically creating a front. PFP is strongly limited in its range; additionally, the initiating radiation source needs to remain active throughout the entire polymerization process.

An example of PFT is disclosed in Crivello et al., J. Polym. Sci. A Polym. Chem. 42(7), 1630-1646 (2003). In this case, a cationic photoinitiator which is also referred to as photoacid generator and will become excited when irradiated with (normally ultraviolet) light; in the excited state, a bond will be cleaved homo- or heterolytically, whereafter a hydrogen atom will be abstracted from the monomers to be cationically polymerized in order to form a so-called photoacid together with the anion. This photoacid is preferably a very strong acid, e.g. a superacid, which will protonate a monomer, thus initiating cationic polymerization. In this specific case of frontal polymerization, light activates the photoacid in the entire sample body, frontal polymerization being then triggered by an external thermal stimulus. It is, however, a disadvantage that the entire sample body needs to be irradiated with light, which is often very difficult or even impossible in case of bulky parts or complicated geometries.

Free radical-induced cationic polymerization (RICP) is a special type of cationic polymerization; it uses a combination of free radical and cationic initiators; for some years, a combination of cationic and thermal free radical initiators has been used, as well: after the cationic polymerization has been initiated by the cationic photoinitiator as described above following the irradiation of a surface of the molded body, the reaction heat released in the course of the exothermic polymerization reaction causes a decomposition of the thermal initiator, thus forming reactive free radicals which will also cleave the cationic initiator, thereby triggering further cationic polymerization reactions in deeper layers and thus an effective frontal polymerization.

When using a thermal cationic initiator instead of a photoinitiator, an analogous cascade will be started by thermal activation using an external heat source. Corresponding reaction systems comprising both, a thermal cationic initiator and a thermal radical initiator, being referred to as a co-catalyst, are, for example, disclosed in U.S. Pat. No. 4,336,366 and the references quoted therein. Among others, benzopinacol derivatives are disclosed as co-catalysts, which are also the subject matter of the invention disclosed therein. However, U.S. Pat. No. 4,336,366 does not describe frontal polymerization.

The present inventors currently only know of a single document in which the concepts of free radical-induced cationic polymerization (RICP) and frontal polymerization are combined: Mariani et al., "UV-ignited Frontal Polymerization of an Epoxy Resin", J. Polym. Sci. A Polym. Chem. 42(9), 2066-2072 (2004).

When a reaction is carried out using the above-described combination of a cationic photoinitiator and a thermal free radical initiator and after the initial irradiation with UV light which will trigger the above-described reaction cascade, a front will develop at the interface between the polymers which have already been generated and the monomers which have not yet been reacted; as long as sufficient heat is released to decompose the thermal initiator, said thermal initiator thus activates the cationic initiator (which is why it is sometimes also referred to as an "activator" for the photoinitiator) new cationic polymerization reactions will continue to be continuously triggered. If the two initiators are available in sufficient amounts, this front will propagate through the entire mixture which is to be polymerized, until the polymerization will be discontinued due to a lack of further unreacted monomers. As the skilled person will know, common cationic photoinitiators are primarily onium salts, such as aryl iodonium. aryl sulfonium or aryl diazonium salts, as well as (a little less reactive) ferrocenium salts which are paired with non-nucleophilic bases as anions, which correspond to the above mentioned strong acids. For some years, it has been mostly hexafluorophosphate, $PF_6^-$, hexafluoroantimonate, $SbF_6^-$, or various borates, such as tetrakis(perfluorophenyl)borate, that have been used for this purpose.

FIG. 1 thus illustrates the reaction sequence of the free radical-induced cationic photopolymerization using the example of a diaryl iodonium salt.

In the RICP processes, common thermolabile free radical generators, such as azo compounds, e.g. azobis(isobutyronitrile) (AIBN), peroxides, e.g. (di)benzoylperoxide (BPO), etc., were used as thermal free radical initiators or "activators" in combination with the cationic photoinitiators.

The currently only known RICP process carried out as frontal polymerization according to Mariani et al. (supra) uses diaryl iodoniumhexafluoroantimonate as a cationic photoinitiator in combination with benzoylperoxide (BPO) as a thermal initiator. The highly reactive 3',4'-epoxycyclohexylmethyl-3,4-epoxycyclohexanecarboxylate (CE) of the formula below was used as a cationically polymerizable monomer:

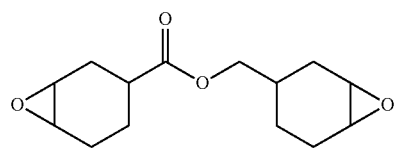

CE

In general, the reaction mixtures used for frontal polymerization normally are free of solvents, as the reaction heat released in the course of the reaction does not have to be dissipated, but is consumed within the reaction system; they are thus inherently very energy-efficient and characterized by high polymerization rates and reaction turnovers.

However, it is a disadvantage that it is effectively impossible to stir the reaction mixtures during the polymerization reaction, as this would result in a destruction of the front, which is why the polymerizate is often inhomogeneous, for example due to the formation of bubbles because of local overheating or gas inclusions.

Among other things, the thermal initiator is responsible for said gas inclusions, as normally gaseous by-products, such as $CO_2$ (in the case of BPO) or $N_2$ (in the case of AIBN) will form in the course of its thermal decomposition. The occasionally high temperatures exceeding 100° C., and often even exceeding 150° C., in the propagating front—in particular if an inhomogeneous distribution of the initiator within the mixture results in local overheating—additionally often cause some monomers to evaporate or result in their thermal decomposition, which again results in the formation of bubbles in the polymerizate, as has been observed by the present inventors for the CE monomer used by Mariani et al. (supra). It is assumed that the superacid will cleave the ester bond of the monomer at these temperatures, resulting in a decarboxylation reaction and the release of $CO_2$.

In addition, these traditional thermal initiators are not able to trigger frontal polymerization with a little less reactive. but very common monomers such as bisphenol A diglycidyl ether (BADGE) shown below or oligomers thereof.

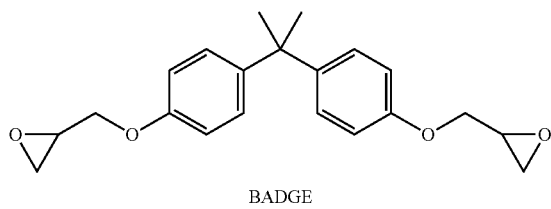 [SMILES: CC(C)(c1ccc(OCC2CO2)cc1)c1ccc(OCC2CO2)cc1]

BADGE

Against this backdrop, the aim of the present invention was to develop a free radical-induced cationic frontal polymerization (RICFP) process which also polymerizes less reactive monomers and allows for largely avoiding any inhomogeneities of the polymerizate.

DISCLOSURE OF THE INVENTION

The present invention achieves this aim by providing a process for free radical-induced cationic frontal polymerization of cationically polymerizable monomers using a combination of at least one cationic polymerization initiator and at least one activator for said at least one initiator, characterized in that benzopinacol is used as said activator, and by providing the use of benzopinacol as an activator for cationic polymerization initiators in free radical-induced cationic frontal polymerization of cationically polymerizable monomers.

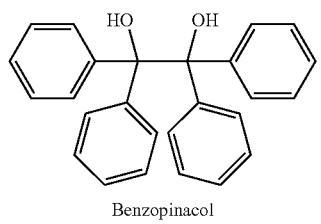 [SMILES: OC(c1ccccc1)(c1ccccc1)C(O)(c1ccccc1)c1ccccc1]

Benzopinacol

In the course of their research, the inventors studied a number of known thermal free radical initiators as activators for various cationic photoinitiators, including C—C-labile compounds as well as various peroxides, acylperoxides, percarbonates, sulfonylperoxides, and azo compounds; surprisingly, they found that benzopinacol was not only the only thermal initiator which yielded essentially bubble-free polymerizates with all tested monomers, but, as the examples below will show, also the only initiator which was capable of initiating frontal polymerization of common, but hardly reactive monomers, such as BADGE, in the first place.

This was even more surprising for the following reasons:
On the one hand, D. Braun and K. Becker disclosed benzopinacol and several of its derivatives halogenated in the para-position of the aromatic compounds as effective thermal polymerization initiators already in the late 1960s (if only for traditional free radical polymerization of olefinic monomers (see Braun and Becker, "Aromatische Pinakole als Polymerisationsinitiatoren", Angew. Makromol. Chem. 6(1), 186-189 (1968)). The above-mentioned U.S. Pat. No. 4,336,366 from 1981 also discloses benzopinacol derivatives as "co-catalysts" for (albeit thermal) cationic initiators.

On the other hand, this US patent expressly only describes and claims benzopinacol derivatives without free OH groups, i.e. derivatives specifically alkylated, acylated or silylated at the two oxygen atoms, as suitable, for these are expected to decompose already at very low temperatures, even though temperatures of 60 to 200° C., preferably of 100 to 160° C., are used for polymerization. Before that, Braun and Becker also found that benzopinacol and its halogenated derivatives only decompose at relatively high temperatures, although a noticeable decomposition is said to be observed already at 40° C. (Braun and Becker; supra).

Contrary to the disclosure of U.S. Pat. No. 4,336,366, the inventors have found that benzopinacol is perfectly suitable for the specific purposes of the present invention, i.e. for use as a thermal free radical initiator in combination with a cationic photoinitiator in free radical-induced cationic frontal polymerization of cationically polymerizable monomers, as it is not only the only initiator de facto capable of generating a front propagating through the reaction mixture, but additionally yields essentially bubble-free polymerizates.

The cationic polymerization initiator(s) used in combination with benzopinacol is/are not specifically limited, but preferably selected from the common iodonium, phosphonium, sulfonium, diazonium and ferrocenium salts or from thiopyrylium, pyrylium and selenonium salts, more preferably from aryl-substituted representatives of these salts, and even more preferably from salts of very strong acids formed with non-nucleophilic bases, including $B(C_6F_5)_4^-$, $SbF_6^-$, $AsF_6^-$, $PF_6^-$, or $BF_4^-$. According to the present invention, a diaryliodonium salt is particularly used for this purpose, as these salts are the most common representatives of cationic initiators and as the reactivity of iodonium salts may be increased to a significantly greater extent than that of other onium salts by adding sensitizers such as isopropylthioxanthone or dibutyl anthracene (cf. J. Crivello, K. Dietliker, "Chemistry and Technology of UV and EB Formulations", $2^{nd}$ ed., vol. III, p. 349, Wiley).

In particularly preferred embodiments, (4-octyloxyphenyl)(phenyl)iodonium hexafluoroantimonate or (4-isopropylphenyl)(4'-methylphenyl)iodonium tetrakis(pentafluorophenyl)borate and, more preferably, diphenyliodonium tetrakis(perfluoro-t-butyloxy)aluminate are used as said cationic polymerization initiators, which allows for the achievement of excellent results.

In preferred embodiments, the cationic polymerization is carried out as a ring-opening polymerization (cf. J. Crivello, K. Dietliker, "Chemistry and Technology of UV and EB Formulations", $2^{nd}$ ed., vol. III, p. 334, Wiley), although non-cyclic monomers such as vinyl ethers may be used, as well. In particularly preferred embodiments, mono- or multivalent epoxides (oxiranes), thiiranes (episulfides), oxetanes, lactames, lactones, lactide, glycolide, tetrahydrofurane, or mixtures thereof, in particular one or more multivalent epoxides or vinyl ethers or isobutylene derivatives, can be used as cationically polymerizable monomers.

The frontal polymerization reaction using benzopinacol according to the invention as a thermal initiator may, however, also be initiated in the presence of sensitizers and/or additional photoinitiators in order to increase the light yield and accelerate the start of the polymerization or initiating it in the first place, for example in the presence of fillers absorbing light of the wave-length rang of the cationic photoinitiator (typically less than 400 nm, often even less than 300 nm). The reaction cascade of the pair of cationic and thermal initiators may also be thermally initiated, initial heat energy supply causing benzopinacol to decompose into free radicals which will then trigger the decomposition of the cationic initiator, after which the cascade will proceed as described above.

Such embodiments of the invention will be documented referring to examples below.

Additionally, preferred embodiments of the invention may not only use a mixture of various cationically polymerizable monomers such as epoxides, as mentioned above, but also a mixture of cationically and radically polymerizable monomers, to obtain a "hybrid material" consisting of cationic and free radical polymerizates. Benzopinacol as a thermal free radical initiator may, in this case, trigger the decomposition of the cationic photoinitiator and the free radical polymerization of the respective monomers, and/or an additional free radical (thermal oder photo-) initiator is added.

Furthermore, further components which may, for example, be selected from common stabilizers, modifiers, regulators, solvents, dyes, pigments, and mixtures thereof, may be used in addition to the above-mentioned components, as long as they do not interfere with or prevent the frontal polymerization.

BRIEF DESCRIPTION OF THE DRAWINGS

As has already been mentioned, FIG. 1 shows the reaction cascade of a free radical-induced cationic photopolymerization, as indicated by "hv" in the first reaction.

Alternatively, the cascade may also be triggered by heat energy; in this case, the thermal initiator is cleaved first and then in turn activates the cationic initiator. In this case, Reaction 1 is omitted, and the cascade comprises the repeated sequence of the Reactions 3-4-2. When a sensitizer is used, it often absorbs light with longer wavelengths and thus transfers energy to the cationic initiator which will then decompose analogously to Reaction 1, thus triggering the further cascade. When using a free radical photoinitiator, which is often also capable of absorbing higher wavelengths than common cationic initiators, the decomposition of the free radical initiators creates a free radical which decomposes the cationic initiator analogously to Reaction 4, which in turn triggers the reaction cascade according to the above-described scheme, beginning at Reaction 2. Examples of the invention will be described below.

EXAMPLES

The present invention will be specifically described based on the following examples which are only intended to illustrate the practicability of the invention and not intended to limit its scope.

Benzopinacol, which will also be referred to as tetraphenylethylenediol below and abbreviated as TPED, and the other initiators (except for benzopinacol bis(trimethylsilyl ether)) and monomers were commercially available and used in the reactions without further purification.

In order to investigate whether free OH groups of benzopinacol were essential for its reactivity after the first successful experiments, benzopinacol bis(trimethylsilyl ether), also disclosed in U.S. Pat. No. 4,336,366, was synthesized, and its reactivity was tested in a frontal polymerization. Several attempts to produce alkylated and acylated derivatives (benzopinacol dimethyl ether, benzopinacol diacetate), which are also mentioned there, according to the few known synthetic routes failed for unknown reasons so far.

Synthesis Example 1

Production of benzopinacol bis(trimethylsilyl ether) (TPED-Si)

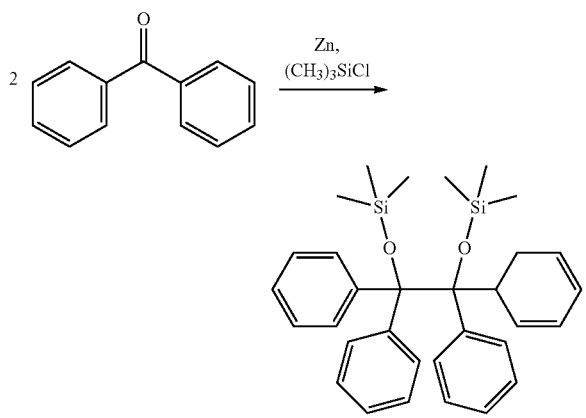

A three-necked flask equipped with a mechanical stirrer, addition funnel, and septum was precharged with 50 mmol of zinc in 10 ml of dioxane, and 10 mmol trimethylchlorosilane were added via the septum. 10 mmol of benzophenone were dissolved in 10 ml of dioxane and slowly added dropwise to the reaction. The reaction flask was placed in an ultrasound bath and sonicated while stirring for 3 hours. The reaction mixture was then filtered and treated with n-hexane, causing a white solid to precipitate. The mixture was evaporated on a rotary evaporator and then treated with petroleum ether until the precipitate thus generated was partially dissolved again. The precipitate was filtered off, and the filtrate was evaporated to dryness on a rotary evaporator, yielding 0.63 g of a white solid which was filtered through silica using PE:DCM as eluent.

Characterization by means of ATR-IR. $^{13}$C- and $^{1}$H-NMR confirmed that the title compound had been obtained.

Examples 1 to 5 and Comparative Examples 1 to 8

Frontal Polymerization Using Various Initiators

One of the currently most widely used epoxide monomers, namely BADGE that has already been mentioned above, was used as a representative monomer; it was attempted to polymerize BADGE using various pairs of cationic photoinitiators and thermal activators.

The initiators were dissolved in 3 ml of dichloromethane in the amounts listed in table 1 below. The respective clear solution was then mixed with 15 g of BADGE monomer and stirred in an oil bath at 50° C. Dichloromethane was then removed in vacuo and the formulation was degassed at the same time. After 3 hours, 3.7 g of each of the samples were transferred into a polymerization mold made of polytetrafluoroethylene having cylindrical recesses equipped with thermal sensors to determine the front's temperature in the course of polymerization, the maximum temperature ($T_{F,max}$) being used as a basis for comparison.

The formulation was irradiated vertically at one end of the polymerization mold via an optical waveguide coupled to an Omnicure 2000 mercury vapor lamp with a wave-length filter of 320 to 500 nm. UV light intensity was set to 3 W/cm$^2$ at the waveguide's outlet. The polymerization process was recorded using a commercial digital camera and evaluated after the reaction had been completed. Front velocity ($V_F$) was determined using a ruler attached to one side of the polymerization mold.

(4-Octyloxyphenyl)(phenyl)iodonium hexafluoroantimonate (IOC-8) and (4-isopropylphenyl)(4'-methylphenyl)iodonium tetrakis(pentafluorophenyl)borate (PFPB) were the two tested cationic photoinitiators.

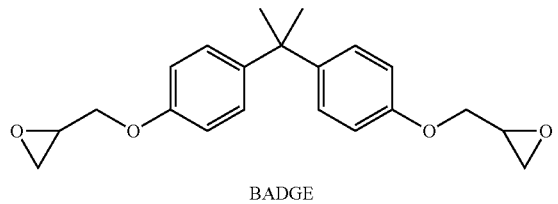

BADGE

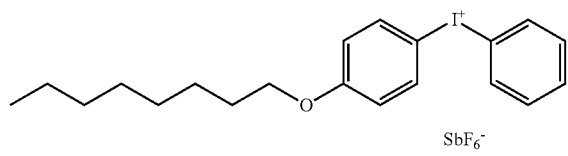

IOC-8

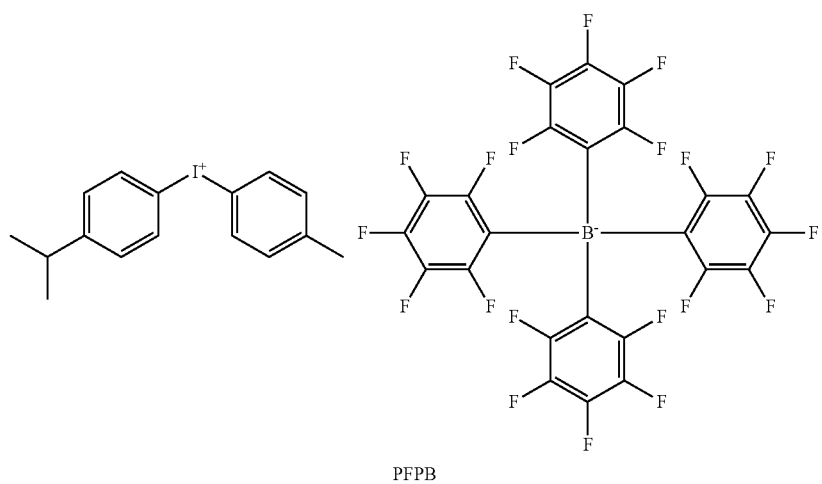

PFPB

In total, nine different compounds were tested as activators, i.e. as thermal initiators. In addition to benzopinacol (TPED) and its disilyl ether (TPED-Si) with the dinitrile TPE-CN, tetrafluoroethane (TPE-H) and triphenylacetophenone (TPAP), three further C—C-labile thermal free radical initiators which do not form any gaseous by-products were tested:

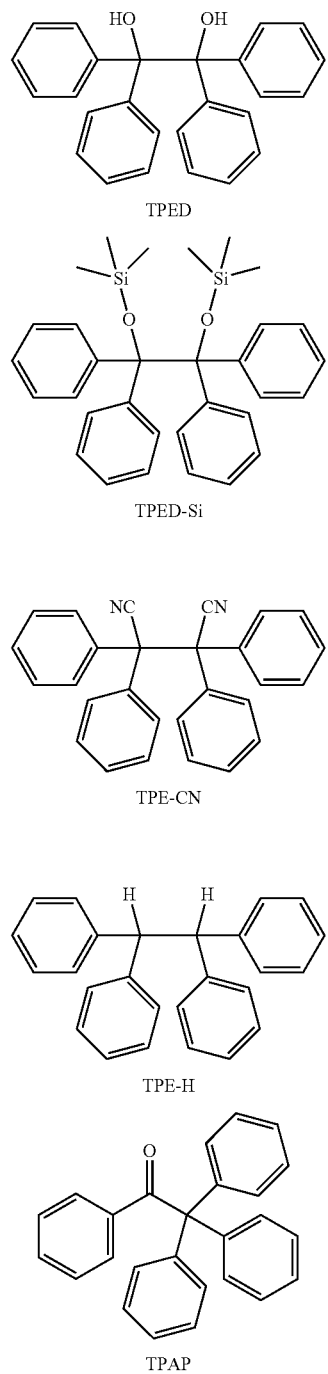

Additionally, the three common thermal peroxide initiators tert-butylperoxide (TBPO), tert-butylcyclohexylperoxodicarbonate (TBC-PDC), and benzoylperoxide (BPO) as well as azo-bis(isobutyronitrile) (AIBN) were examined:

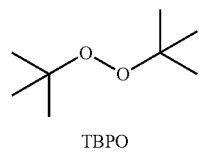

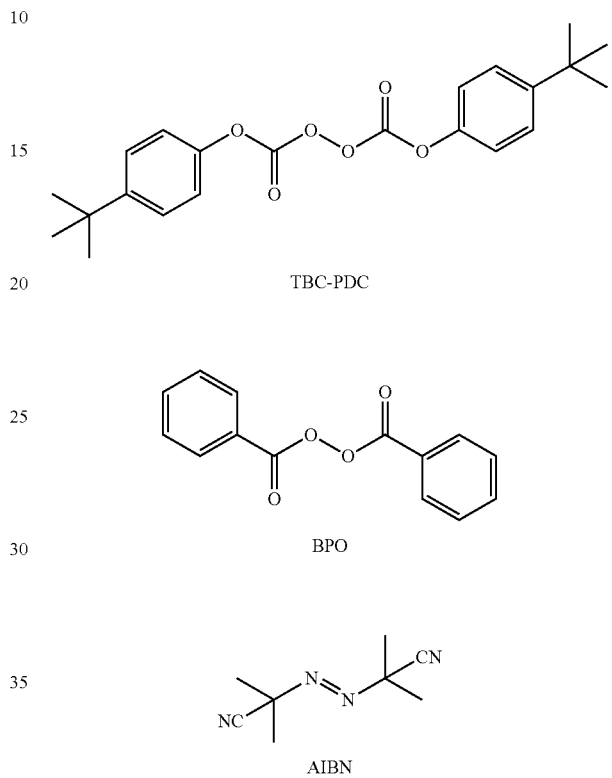

Furthermore, dimethylsulfonylperoxide (DMSP) was tested as a further thermal initiator which, contrary to the above-mentioned representatives, does not result in the release of gas.

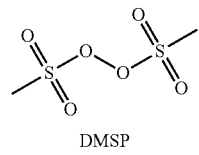

In a first series of experiments, the various thermal initiators were first examined at a molar concentration of 2 mol % using the same molar amount of the cationic initiator (IOC-8).

In a second series of experiments, benzopinacol (TPED) was tested at varying concentrations and with various initiators.

Table 1 below shows the results of these two series of experiments for the Examples of the invention (B1 to B5) and Comparative Examples (V1 to V8).

TABLE 1

Frontal polymerization of BADGE

| Example | cat. initiator | c(cat. init.) [mol %] | therm. initiator | c(therm. init.) [mol %] | $V_F$ [cm/min] | $T_{F.\ max}$ [° C.] | front developed |
|---|---|---|---|---|---|---|---|
| B1 | IOC-8 | 2.0 | TPED | 2.0 | 8.6 | 189 | + |
| B2 | IOC-8 | 2.0 | TPED-Si | 2.0 | 3.5 | 139 | + |
| V1 | IOC-8 | 2.0 | TPE-CN | 2.0 | – *) | – *) | – |
| V2 | IOC-8 | 2.0 | TPE-H | 2.0 | – *) | – *) | – |
| V3 | IOC-8 | 2.0 | TPAP | 2.0 | – *) | – *) | – |
| V4 | IOC-8 | 2.0 | TBPO | 2.0 | – *) | – *) | – |
| V5 | IOC-8 | 2.0 | TBC-PDC | 2.0 | – *) | – *) | – |
| V6 | IOC-8 | 2.0 | BPO | 2.0 | – *) | – *) | – |
| V7 | IOC-8 | 2.0 | AIBN | 2.0 | – *) | – *) | – |
| V8 | IOC-8 | 2.0 | DMSP | 2.0 | – *) | – *) | – |
| B1 | IOC-8 | 2.0 | TPED | 2.0 | 8.6 | 189 | + |
| B3 | IOC-8 | 0.75 | TPED | 2.0 | 2.3 | 172 | + |
| B4 | IOC-8 | 2.0 | TPED | 1.0 | 5.8 | 217 | + |
| B5 | PFPB | 2.0 | TPED | 2.0 | 11.4 | 209 | + |

*) no frontal polymerization

It can be clearly seen in Table 1 that of all nine thermal initiators that were tested only benzopinacol (TPED) and its silylether TPED-Si were capable of triggering frontal polymerization in the first place.

In all the other cases, i.e. in the Comparative Examples 1 to 8, polymerization occurred locally in the irradiated areas, but there was not any front propagating through the reaction mixture.

Without wishing to be bound by theory, the inventors assume that the reactivity of the silyl ether TPED-Si was due to an (at least partial) hydrolysis of the O—Si bonds in the presence of the strong photoacid, resulting in the in situ formation the reactive diol TPED. This is supported by the fact that the propagation speed of the front, which, for TPED, was 2.5 times higher than that of TPED-Si ($\Delta V_F$: 5.1 cm/min), was significantly lower—at the same initiator concentration—as well as by the front temperature which was significantly lower ($\Delta T_{F.max}$: 50° C.).

It may be assumed that structurally similar compounds like TPED-Si, i.e. those in which one or both OH groups of TPED are provided with "protective groups" which can be easily cleaved under the strongly acidic conditions prevailing during frontal polymerization in the presence of photoacids in order to form the free diol TPED. Examples of ethers which may be used as protective groups include, among others, silyl ethers, such as t-butyldimethylsilyl ether or t-butyldiphenylsilyl ether, e.g. tert-butyl ether, methoxymethyl ether, allyl ether, benzyl ethers, or tetrahydropyranyl ether. Additionally, acetone- or benzaldehyde-based 1,2-acetal groups as well as acetyl esters or pivaloyl esters are easily cleavable.

Such protected forms of TPED which release benzopinacol during frontal polymerization are thus also included in the scope of the present invention.

The results of the second series of experiments in which only benzopinacol was used as thermal initiator, i.e. the Examples 3 to 5 compared to Example 1, further show that:

a) a stable front develops even if the amount of cationic photoinitiator is reduced from 2 to 0.75 mol % (Example 3); and b) benzopinacol produces a fast propagating front already at half of the concentration at 1 mol % (still propagating approx. 50% faster than that achieved using twice the amount of TPED-Si) (Example 4);

c) the propagation speed of the front may even be increased by approx. one third when using the same amount of PFPB instead of IOC-8 as cationic photoinitiator.

Additionally, all the examples of the invention produced practically bubble-free polymerizates as determined by a visual inspection of the thoroughly polymerized resins.

Benzopinacol is thus an excellent thermal initiator for use in such frontal polymerization reactions.

Examples 6 to 13

Variation of the Cationically Polymerizable Monomers

Using a pair of initiators with IOC-8 as a cationic photoinitiator and benzopinacol (TEPD) as a thermal initiator in the same experimental setting as described for the above examples, different ratios using other cationically polymerizable monomers in the reaction mixtures were studied; Table 2 below shows the selected conditions.

TABLE 2

Variation of cationically polymerizable monomers

| Example | monomer | c(IOC-8) [mol %] | c(TPED) [mol %] | $V_F$ [cm/min] | $T_{F.\ max}$ [° C.] | front developed |
|---|---|---|---|---|---|---|
| B6 | CE | 1.0 | 1.0 | 26.2 | 176 | + |
| B7 | CE | 1.0 | 2.0 | 23.2 | 169 | + |
| B8 | CE | 1.0 | 3.0 | 27.5 | 166 | + |
| B9 | Epikote 827 | 1.0 | 1.0 | 2.6 | 182 | + |
| B10 | CHDGE | 2.0 | 2.0 | 37.9 | 140 | + |
| B11 | HDDGE | 1.0 | 1.0 | 28.6 | 181 | + |
| B12 | NPDGE | 1.0 | 1.0 | 19.9 | 169 | + |
| B13 | BADGE | 1.0 | 1.0 | 4.9 | 184 | + |

The structure of the monomers used are shown on the next page.

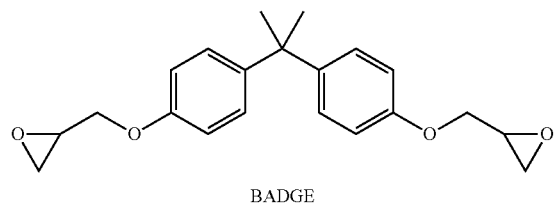
BADGE

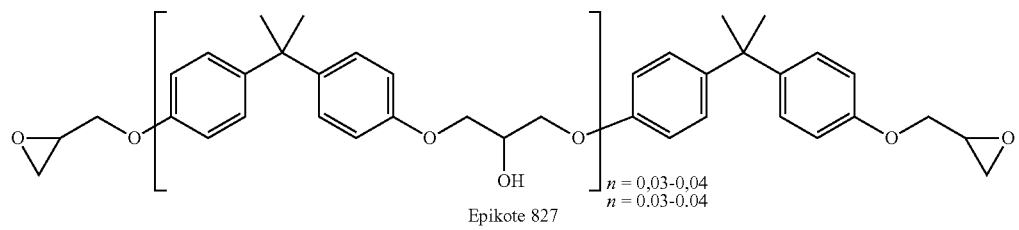
Epikote 827

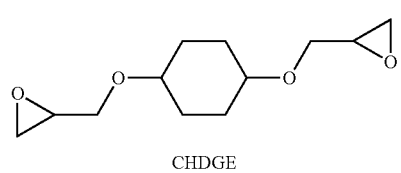
CHDGE

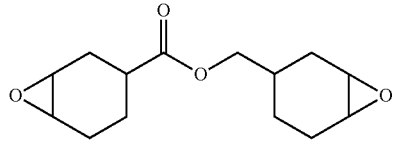
CE

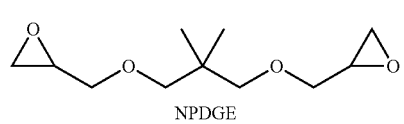
NPDGE

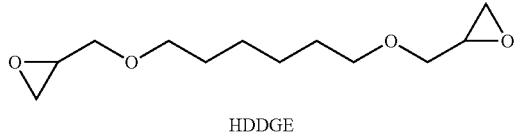
HDDGE

Table 3 shows that, other than the currently most widely used resin BADGE, numerous other cationically polymerizable resins may be cured by free radical-induced cationic frontal polymerization using the process of the invention. The initiator concentration may also be varied without any problems and without significantly changing the front properties (see Examples 6 to 8, in particular).

The significantly increased reactivity of the initiator system when using cycloaliphatic or aliphatic epoxide resins when compared to the epoxide resin formulations based on bisphenol A from the Examples 9 and 13 also becomes evident.

Examples 14 to 19

Reaction Mixtures With Filler

New composites may be produced using fillers, such as silicates. In the field of power generation, mica films wrapped around copper rods are used as electric insulators, for example. These films are usually stabilized using epoxide resin systems and applying vacuum impregnation.

This group of examples will thus examine the frontal polymerization of epoxide resin formulations filled with mica powder, using two different monomers and the IOC-8/TPED pair of initiators.

As mica absorbs waves at lengths of the same range as the cationic photoinitiator IOC-8, it is not possible to initiate the reaction cascade by decomposing IOC-8 by means of irradiation as in the examples above.

a) Initiation Using Thermal Energy

At first, the thermal initiator TPED was cleaved into free radicals by locally applying heat to the reaction mixture (e.g. using a soldering iron or a hot air fan), said free radicals causing the cationic initiator to decompose, triggering the usual cascade (Examples 14-16).

b) Photochemical Initiation Using Sensitizers

The cascade was triggered by adding photosensitizers ("sensitizers") having maximum absorptions at other (normally higher) wavelengths than the cationic photoinitiator as well as mica (ideally precisely at the lamp's emission maximum) and transmitting the thus absorbed light energy to the photoinitiator to achieve its activation. Perylene was used as an exemplary sensitizer (Examples 18-19).

c) Photochemical Initiation of an Additional Photoinitiator

In this case, the cascade was triggered using an additional photoinitiator which also absorbed waves in another (mostly higher) range than IOC-8 and mica and formed free radicals activating the cationic initiator. For this purpose, the commercially available germanium initiator from Ivoclar Vivadent, Ivocerin®, was used (Example 17).

Table 3 below shows the formulations and results of the above examples.

TABLE 3

| | | Filled formulations | | | | | | |
|---|---|---|---|---|---|---|---|---|
| Example | monomer | c(IOC-8) [mol %] | c(TPED) [mol %] | c(perylene) [mol %] | c(Ivocerine) [mol %] | c(mica) [%] | $V_F$ [cm/min] | $T_{F, max}$ [° C.] | front developed |
| B14 | BADGE | 1.0 | 8.0 | | | 15 | 3.7 | 183 | + |
| B15 | BADGE | 1.0 | 8.0 | | | 10 | 3.8 | 176 | + |
| B16 | BADGE | 1.0 | 8.0 | | | 5 | 4.0 | 187 | + |
| B17 | BADGE | 1.0 | 8.0 | | 2.0 | 5 | 3.1 | 157 | + |
| B18 | BADGE | 2.0 | 2.0 | 0.5 | | 10 | 8.1 | 190 | + |
| B19 | CHDGE | 2.0 | 2.0 | 0.2 | | 10 | 16.9 | 126 | + |

Table 3 shows that a stable front propagating through the reaction mixture was developed in all cases.

In further experiments (which are not described in detail herein) using photosensitizers, anthracene and 3-ITX (3-isopropyl 9H-thioxanthen-9-one) proved useful as sensitizers for IOC-8 in the presence of TPED as thermal initiator, while a front again failed to develop when using combinations of IOC-8 and various thermal initiators (TBPO, TBC-PDC, BPO, AIBN, and DMSP) as initiator pairs.

Examples 20 to 24, Comparative Example 9

Physical Properties of Formulations and Products Formed Thereof

The properties of polymers produced by free radical-induced cationic frontal polymerization (RICFP) are similar to or exceed those of polymers produced by traditional thermal curing. This will be illustrated in the following examples in which storage stability, thermo-mechanical, mechanical, and electric properties of BADGE polymers produced by RICFP will be compared to BADGE polymers produced by anhydride curing using methylhexahydrophthalic anhydride. In all cases, IOC-8-SbF$_6$ was used as photoacid generator (PAG) and benzopinacol (TPED) was used as free radical thermal initiator (RTI). The precise compositions of the formulations can be found in the individual examples.

Examples 20 and 21, Comparative Example 9

Storage Stability

The storage stability of formulations is an essential parameter for the reproducibility of polymerization reactions carried out using these formulations. To examine storage stability, mixtures of bisphenol A diglycidyl ether was produced using the free radical thermal initiator and the photoacid generator at two different concentrations. Based on preparatory experiments, concentrations of 1 and 2 mol % of the initiator and the photoacid generator were selected. In a Comparative Example a commercially available system consisting of BADGE and an anhydride-based curing agent, methylhexahydrophthalic anhydride (MHHPA), together with an organic Zn salt as accelerator (see technical datasheet for Araldite Impregnating Resin System MY 790-1. CH/HY 1102; 2008) was used. As BADGE formulations tend to crystallize when stored at temperatures below 50° C., all formulations were stored at 50° C. and under exclusion of light to prevent any undesired activation of the photoinitiator.

The viscosity of the formulation was measured directly after mixing and at certain intervals by means of rheometry to gain insight into their storage stability with a view to premature gelling. These viscosity measurements were carried out using an Anton Paar MCR 300 rheometer with a Peltier oven and a CP-50 measuring system. The measures were carried out under rotation with a shearing rate of 100 s$^{-1}$ for 100 s at a constant temperature of 50° C. (to prevent any crystallization induced by shearing at temperatures close to the melting point). The last viscosity value of this period of 100 seconds was used for the analysis. All measures were carried out three times, the results were averaged.

TABLE 4 dynamic viscosity as a function of storage time

| | FORMULATIONS | | |
|---|---|---|---|
| Tag | IOC/TPED per 1 mol % [Pa · s] | IOC/TPED per 2 mol % [Pa · s] | MHHPA + Zn accelerator [Pa · s] |
| 0 | 0.327 | 0.374 | 0.072 |
| 1 | 0.364 | 0.415 | 0.088 |
| 2 | 0.371 | 0.512 | 0.276 |
| 3 | 0.372 | 0.623 | 1.117 |
| 4 | 0.393 | 0.662 | 5.005 |
| 7 | 0.439 | 0.772 | —[1)] |
| 11 | 0.489 | 1.120 | —[1)] |
| 18 | 0.527 | 1.387 | —[1)] |
| 28 | 0.575 | 1.770 | —[1)] |

[1)] Sample could not be measured, as it had gelled.

At 50° C. and under light exclusion, the formulation with 1 mol % IOC and TPED remains very stable for 4 weeks. When increasing the respective concentrations to 2 mol %, the viscosity will start increasing slightly after approx. 1 week, the formulation remains suitable for processing, however. In the Comparative Example using anhydride, viscosity significantly increases already after 3 days, and after 5 days the formulation had turned inhomogeneous, so that its viscosity could no longer be determined. Formulations including benzopinacol as activator thus show very good storage stability.

Examples 22 to 24

Thermo-Mechanical Properties

Glass transition temperature $T_g$ as determined by DSC was used as a significant parameter. Samples from the central portion of polymer rods cured by means of RICFP were taken and ground in a Retsch cryomill to obtain fine polymer powders. These polymer powders were accurately weighed into aluminum dishes, DSC signals were recorded by a Netsch STA 449 F1 in two cycles at temperatures of 25° C. to 250° C., a heating rate of 30 K/min, 5 min retention time at 250° C. and cooling to 25° C. at 20 K/min. $T_g$ was determined during the second cycle. All measurements were carried out three times, and the results were averaged.

TABLE 5

| c(PAG) [mol %] | c(RTI) [mol %] | $T_g$ [° C.] |
|---|---|---|
| | Glass transition temperature. $T_g$ | |
| 1 | 1 | 168 ± 2 |
| 2 | 1 | 160 ± 3 |
| 2 | 2 | 156 ± 4 |

$T_g$ of the anhydride-cured BADGE system was identified as 154±4° C. Table 5 shows that the $T_g$ RICFP-cured systems are all 5 to 10° C. higher than that of traditional materials, making them more stable at higher temperatures. The fact that $T_g$ decreases when concentrations of both the cationic and the thermal initiator increase may be due to the shorter kinetic chain lengths: at higher initiator concentrations more chains are initiated, resulting in shorter chain lengths.

Examples 25 to 37. Comparative Examples 10 to 21

Comparison of Varying Concentrations.

Diphenyliodonium tetrakis(perfluoro-t-butyloxy)aluminate, DPI-TTA, is an aluminum-based cationic initiator which is particularly preferred according to the invention:

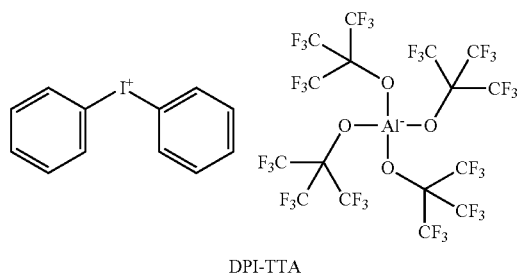

DPI-TTA

It was compared to hexafluoroantimonate-based IOC-8 $SbF_6$, which is commercially available and was used before, and to tetraarylborate-based DAI-PFPB, which is also commercially available, but significantly more expensive.

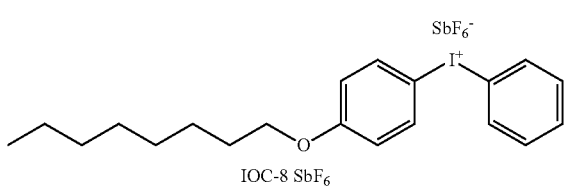

IOC-8 $SbF_6$

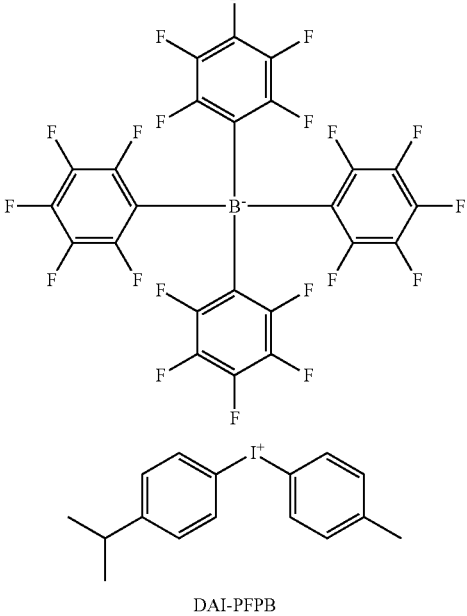

DAI-PFPB

To this end, formulations including 1 mol % of the free radical thermal initiator (RTI) benzopinacol (TPED) and three cationic initiators at various concentrations in BADGE as epoxide resin were produced. It was then attempted to cure these formulations by means of frontal polymerization. After successful frontal polymerization reactions, front parameters were determined. The results of this study are shown in Table 6. Table 6 includes $v_F$ representing front velocity, i.e. the speed at which the local polymerization zone propagates, and $T_{F.max}$ standing for the front's maximum temperature. "-1)" means that frontal polymerization was not achieved using a particular formulation.

TABLE 6

Front parameters of RICFP formulations

| Example | RTI. 1 mol % | cat. initiator | c(cat. init.) [mol %] | $v_F$ [cm/min] | $T_{F.max}$ [° C.] |
|---|---|---|---|---|---|
| V10 | TPED | IOC-8 $SbF_6$ | 0.010 | —1) | —1) |
| V11 | TPED | IOC-8 $SbF_6$ | 0.015 | —1) | —1) |
| V12 | TPED | IOC-8 $SbF_6$ | 0.025 | —1) | —1) |
| V13 | TPED | IOC-8 $SbF_6$ | 0.050 | —1) | —1) |
| V14 | TPED | IOC-8 $SbF_6$ | 0.100 | —1) | —1) |
| V15 | TPED | IOC-8 $SbF_6$ | 0.250 | —1) | —1) |
| V16 | TPED | IOC-8 $SbF_6$ | 0.500 | —1) | —1) |
| B25 | TPED | IOC-8 $SbF_6$ | 1.000 | 3.8 | 192 |
| B26 | TPED | IOC-8 $SbF_6$ | 2.000 | 5.8 | 217 |
| V17 | TPED | DAI-PFPB | 0.010 | —1) | —1) |
| V18 | TPED | DAI-PFPB | 0.015 | —1) | —1) |
| V19 | TPED | DAI-PFPB | 0.025 | —1) | —1) |
| B27 | TPED | DAI-PFPB | 0.050 | 3.3 | 191 |
| B28 | TPED | DAI-PFPB | 0.100 | 3.9 | 205 |
| B29 | TPED | DAI-PFPB | 0.250 | 6.2 | 215 |
| B30 | TPED | DAI-PFPB | 0.500 | 7.8 | 200 |
| B31 | TPED | DAI-PFPB | 1.000 | 9.4 | 215 |
| V20 | TPED | DPI-TTA | 0.010 | —1) | —1) |
| V21 | TPED | DPI-TTA | 0.015 | —1) | —1) |
| B32 | TPED | DPI-TTA | 0.025 | 3.1 | 183 |
| B33 | TPED | DPI-TTA | 0.050 | 3.6 | 193 |
| B34 | TPED | DPI-TTA | 0.100 | 4.6 | 206 |
| B35 | TPED | DPI-TTA | 0.250 | 6.6 | 203 |
| B36 | TPED | DPI-TTA | 0.500 | 8.9 | 210 |
| B37 | TPED | DPI-TTA | 1.000 | 9.9 | 202 |

As shown in Table 6, tetraarylborate-based DAI-PFPB may already help to achieve a significant reduction in the concentration of the cationic initiator. In the case of IOC-8 SbF$_6$, a stable frontal polymerization using BADGE becomes impossible already at a concentration of 0.5 mol %. In case of the novel aluminum-based DPI-TTA a further reduction in the concentration to 0.025 mol % becomes possible, while retaining frontal polymerization capability. The Table further shows that, compared to hexafluoroantimonate-based IOC-8 SbF$_6$, it is possible to significantly increase front velocities using DPI-TTA as cationic initiator.

Examples 38 to 44. Comparative Example 22

Frontal Polymerization in Thin Layers

Frontal polymerization is based on using released polymerization heat for cleaving thermal initiators which maintain the front. Frontal polymerizations are thus strongly dependent on the released amount of energy. This, in turn, depends on the mass of the formulation, the content in reactive groups and the heat capacity of adjacent materials. Frontal polymerization is thus always limited in respect of its layer thickness, as volume and mass, and thus surface and associated heat losses continue increasing with a decrease of layer thickness. The set-up which is described in detail below was developed to determine the minimum layer thickness of the present system.

Method and Experiment Set-Up

The finished formulation was introduced into a polymerization mold with an initial height of 5 mm. The mold's height constantly decreases over a distance of 9.7 cm. To avoid any deformation of the polymer, the polymerization line was covered by a PTFE lid. The formulations were irradiated until the front became visible in a small viewing gap. After the polymer had been cooled, it was demolded and measured. The thickness at the thinnest end of the polymer was determined using calipers; the results from three polymerization experiments were averaged.

For a comparison of the cationic initiators IOC-8 SbF$_6$ and DPI-TTA, formulations with 0.1 and 1 mol % of one of the cationic initiators and 1 or 8 mol % of the thermal Initiator TPED were used in BADGE resin. The results of this study are shown in Table 7.

TABLE 7

Comparison of layer thicknesses achieved at varying initiator concentrations

| Example | cationic initiator | c(cat. init.) [Mol %] | layer thickness [mm] | |
|---|---|---|---|---|
| | | | 1 mol % TPED | 8 mol % TPED |
| V22 | IOC-8 SBF$_6$ | 0.1% | — [1] | — [1] |
| B38 | IOC-8 SBF$_6$ | 1.0% | 4.4 ± 0.28 | 2.53 ± 0.06 |
| B39 | DPI-TTA | 0.1% | 2.52 ± 0.08 | — [2] |
| B40 | DPI-TTA | 1.0% | 1.32 ± 0.04 | 0.75 ± 0 |

[1] frontal polymerization not possible
[2] not investigated

Table 7 clearly shows that the layer thickness which may be achieved using DPI-TTA is significantly lower than that achieved when using IOC-8 SbF$_6$. When using IOC-8 SbF$_6$ at a concentration of 0.1 mol % it was impossible to initiate frontal polymerization, at a concentration of 1 mol % frontal polymerization was achieved. When increasing the concentration of the thermal initiator TPED from 1 to 8 mol %, it was possible to decrease layer thickness by approx. 50%; it was, however, still not possible to achieve the same thickness which could be reached using DPI-TTA at one tenth of the concentration of the cationic initiator and one eighth of the concentration of the thermal initiator.

Due to the excellent results achieved using DPI-TTA as cationic initiator for frontal polymerization in thin layers, a detailed study was carried out to investigate the influence of the concentrations of thermal and cationic initiators on minimum layer thickness. The concentrations of DPI-TTA and TPED were thus varied further.

TABLE 8

Variation of initiator concentrations

| Example | c(DPI-TTA) [mol %] | layer thickness [mm] c(TPED) | | | |
|---|---|---|---|---|---|
| | | 1 mol % | 2 mol % | 4 mol % | 8 mol % |
| B41 | 0.10 | 2.52 | 2.05 | 1.65 | — [1] |
| B42 | 0.25 | 1.79 | 1.50 | 1.12 | — [1] |
| B43 | 0.50 | 1.38 | 1.25 | 0.93 | — [1] |
| B44 | 1.00 | 1.32 | 1.10 | 0.83 | 0.75 |

[1] not determined

Table 8 shows that the minimum layer thickness decreases with an increasing concentration of the thermal initiator (TPED) and with an increasing concentration of the cationic initiator (DPI-TTA). The development of the interdependence suggests that the minimum layer thickness achievable with this system will not be much lower than 0.75 mm.

Example 45

Application Example "Chemical Anchor"

Chemical anchors are formulations allowing for fixing screws, bolts, threaded rods and the like in bores. There is a choice between two options: fast reaction times with a short pot life or a long pot life associated with a disadvantageous very long top life with very fast curing. The use of formulations which may be cured by free radical-induced cationic frontal polymerization (RICFP) as a mass for chemical anchors is thus advantageous, combining a long pot life with very fast curing. The reaction may be initiated by irradiation with (UV) light or by the local application of heat (for example using a soldering iron or a hot air gun).

Formulation

A typical formulation consists of an epoxide resin, such as bisphenol A diglycidyl ether, a cationic photoinitiator, such as the initiator DPITTA of the invention, and a free radical thermal initiator, such as benzopinacol. To produce the formulation, the initiators are dissolved in as small an amount of dichloromethane as possible and then mixed with the resin. Dichloromethane is then completely removed under stirring in vacuo at 50° C.

TABLE 9

Typical formulation for a non-pre-treated bore

| component | concentration [mol %] | mass [g] | note |
|---|---|---|---|
| bisphenol A diglycidyl ether | — | 27.23 | BADGE |
| diphenyliodonium tetrakis-(perfluoro-tert-butyl) aluminate | 0.5 | 0.50 | DPI TTA |

TABLE 9-continued

Typical formulation for a non-pre-treated bore

| component | concentration [mol %] | mass [g] | note |
|---|---|---|---|
| 1.1.2.2-tetraphenyl ethanediol | 4.0 | 1.17 | TPED, benzopinacol |
| 3-glycidoxypropyl trimethoxy-silane | 7.2 | 1.36 | GPTMS primer |

Preparing the Bores

A percussion drill was used to drill bores with a diameter of 14 mm into granite, concrete, and bricks. The bores were then cleaned with compressed air in order to remove any adherent dust. As the adhesion between the rocks and the epoxide formulations may be insufficient, it may be improved using a primer. The primer may either be mixed with the formulation or pre-applied into the bores. In the present case, 3-glycidoxypropyltrimethoxysilane was used as a primer.

Method A: Directly Pre-Treating the Bores

As a pretreatment a formulation comprising 50 ml of ethanol (96%), 0.23 ml of 3-glycidoxypropyltrimethoxysilane, and 1.5 ml diluted acetic acid (glacial acetic acid:water 1:10) was prepared. The bores were completely filled with this solution which was allowed to act for approx. 1 hour at room temperature. The rocks (concrete, granite, and bricks) were then kept in an oven at 60° C. over night. The next day, the solution had completely dried. Bores which have undergone such a pretreatment will then be referred to as "primed".

Method B: Adding the Primer to the Reaction Formulation

Together with the initiators, an additional 5% by weight 3-glycidoxypropyl trimethoxysilane were added to the above-described resin formulations. After adding the resin, the solvent was removed and the formulations were degassed.

Threaded Rods

The threaded rods (diameter of 12 mm) were cut to a length of 11 cm and their edges were deburred in order to install them in the rocks. The size of the bore (14 mm) and the diameter of the threaded rods result in an annular gap of 1 mm.

Polymerization

About half of the volume of the bores was filled with the reaction formulation, the threaded rod being than placed at the center. The reaction was then initiated by irradiating the visible surface of the formulation using a UV Vis light source equipped with a 320 to 500 nm filter via an optical guide filled with fluid and having a diameter of 8 mm. Irradiation intensity at the optical guide's outlet was set to 3 W/cm$^2$.

Tensile Strength Experiments

The obtained samples were then examined using a tensile test machine (Zwick Z250) to test the polymer's adhesion between the threaded rod and the rocks. A second threaded rod was fixed to the threaded rods using two nuts and then clamped in the tensile test machine. The rocks were fixed using a counterbearing below them.

The test was carried out at a speed of 10 mm/min. Table 10 shows the typical maximally required forces. It has to be noted that there is no significant difference in the results achieved when adding the primer to the formulation and those achieved by pretreating the bores. Furthermore, the bricks were always partially destroyed in the course of the attempt to tear the rods out.

TABLE 14

Force required to remove threaded rods from the bore

| Material | Maximum force [N] |
|---|---|
| Concrete | 1100 |
| Brick | 1050 |
| Granite | 500 |

In summary, it was sufficiently proven that benzopinacol is an initiator which is excellently suited for free radical-induced cationic frontal polymerization of cationically polymerizable monomers.

The invention claimed is:

1. A process for free radical-induced cationic frontal polymerization of canonically polymerizable monomers comprising using a combination of at least one cationic polymerization initiator and at least one activator for the at least one initiator,
wherein benzopinacol is used as the activator.

2. A process of free radical-induced cationic frontal polymerization of cationically polymerizable monomers comprising using benzopinacol as an activator for cationic polymerization initiators.

3. The process according to claim 1 wherein the cationic polymerization initiators are selected from iodonium, phosphonium, sulfonium, ferrocenium and diazonium salts and aryl-substituted representatives thereof.

4. The process according to claim 3, wherein a diaryliodonium salt is used as the cationic polymerization initiator.

5. The process according to claim 4, wherein (4-octyloxyphenyl)-(phenyl)iodonium-hexafluoroantimonate, (4-isopropylphenyl)(4'-methylphenyl)iodonium-tetra-kis(pentafluorophenyl)borate, or diphenyliodonium-tetrakis(perfluoro-t-butyloxy)aluminate is used as the cationic polymerization initiator.

6. The process according to claim 5, wherein diphenyliodonium-tetrakis(perfluoro-t-butyloxy)aluminate is used as the cationic polymerization initiator.

7. The process according to claim 1, wherein the cationic polymerization is carried out as a ring-opening polymerization.

8. The process according to claim 7, wherein mono- or multivalent epoxides (oxiranes), thiiranes (episulfides), oxetanes, lactames, lactones, lactide, glycolide, tetrahydrofurane, or mixtures thereof are used as the cationically polymerizable monomers.

9. The process according to claim 8, wherein one or more multivalent epoxides are used, as the cationically polymerizable monomers.

10. The process according to claim 1, Wherein one or more multivalent vinyl ethers are used as the cationically polymerizable monomers.

11. The process according to claim 1, wherein a mixture of canonically and radically polymerizable monomers is polymerized, optionally with the addition of a further free radical initiator.

12. The process according to claim 1, wherein the process further includes using one or more additional components selected from further photoinitiators, sensitizers, stabilizers, modifiers, regulators, solvents, fillers, dyes, pigments, and mixtures thereof.

\* \* \* \* \*